$E_4 > E_3 > E_m > E_2 > E_1$

Sept. 13, 1966  NAOKAZU KIMURA  3,272,997
ON-OFF SIGNAL GENERATORS
Filed Dec. 16, 1964  5 Sheets-Sheet 5

FIG 9

INVENTOR
Naokazu Kimura
By Paul M. Craig Jr.
ATTORNEY

United States Patent Office 3,272,997
Patented Sept. 13, 1966

3,272,997
ON-OFF SIGNAL GENERATORS
Naokazu Kimura, Katsuta-shi, Japan, assignor to Hitachi, Ltd., Tokyo, Japan, a corporation of Japan
Filed Dec. 16, 1964, Ser. No. 418,605
9 Claims. (Cl. 307—88.5)

This invention relates to on-off signal generators which generate two different output voltages depending upon positive and negative values of input voltages.

The present invention has for its object to provide a device of the kind described above which has a simplified circuit arrangement and is quite inexpensive.

A further object of the present invention is to provide a voltage comparator which has a quick rate of comparison between an input and a predetermined reference level. The voltage comparator according to the present invention is especially suitable for operation as a comparison circuit in a monitoring device which monitors a multiplicity of points for measuring process variables such as temperature, pressure and flow rate. In process monitoring, a scanner in a monitoring device selects one after another of a multiplicity of measured signals and the signal obtained is compared with a predetermined reference value to detect any difference therebetween so that the monitoring device gives out an alarm signal or indication of presence of an unusual operating condition according to the result of comparison. In such a device, it is desirable that comparison of a multiplicity of measured signals with a predetermined reference value may be effected as quickly as possible, and therefore there has been an ever-increased demand for a voltage comparator which is quick in making comparison. The voltage comparator according to the present invention entirely satisfies such demand as will be apparent from the later description.

According to the present invention, there is provided an on-off signal generator comprising an alternately changeable voltage source and a circuit driven by the aforementioned voltage source and operable either as an amplifier circuit when a driving voltage from said voltage source is smaller than a certain value or as a bistable circuit when the driving voltage is greater than the above-described critical value. In the construction with this, the bistable operation of the circuit of this invention is not provided until the driving voltage reaches the critical value in every alternation of the voltage source. This is very important, and only during the bistable operation, the circuit of the invention operatively generates two different outputs in dependence upon the value of the input signal selectively supplied thereto.

There are other objects and particularities of the present invention which will become obvious from the following description with reference to the accompanying drawings, in which like reference characters are used throughout to designate like parts and in which:

FIG. 9 is a circuit diagram of a temperature regulator which includes therein an on-off signal generator according to the present invention.

Figure 1:
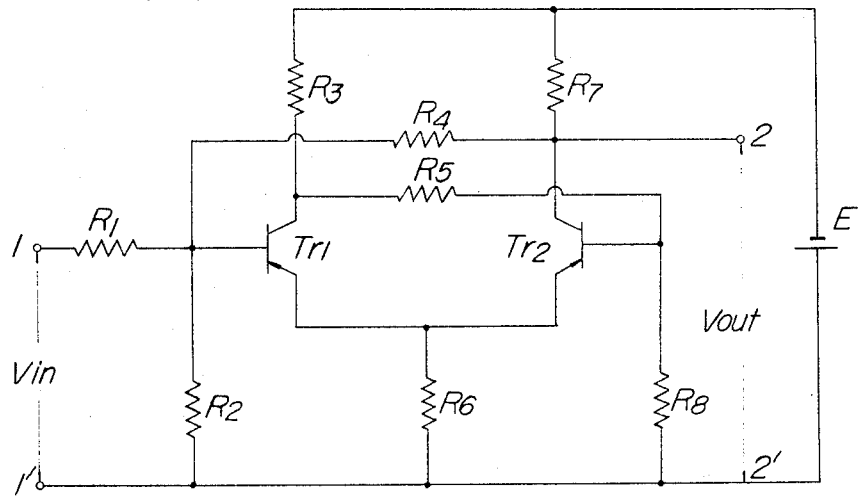
FIG. 1 is a circuit diagram showing the principle of the present invention.

Referring now to FIG. 1, the circuit shown therein has a circuit arrangement similar to a bistable multivibrator. (In the present invention, the circuit is hereinafter referred to as a bistable circuit.) The present invention takes advantage of the fact that this bistable circuit provides two different actions, that is, acts on one hand as an amplification circuit and on the other hand as a bistable circuit providing one of two levels of output depending on the magnitude of a driving voltage E, and further the circuit under bistable operation may critically generate either an ON or an OFF output signal in accordance with the input signal applied thereto.

Figure 2:
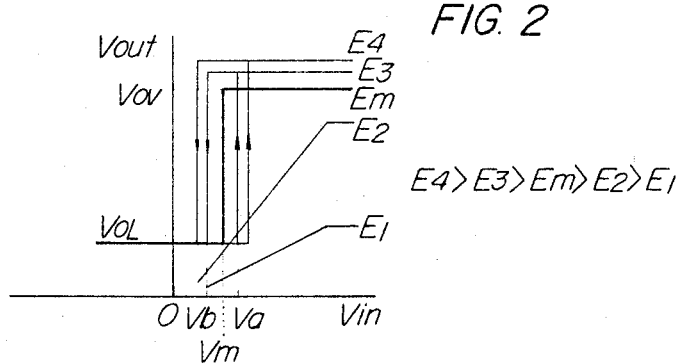
FIG. 2 is a graphic representation of input-output characteristics of the circuit of FIG. 1.

The circuit of FIG. 1 is composed of a pair of transistors $Tr_1$ and $Tr_2$, resistances $R_1$–$R_8$ and a source of driving voltage E. As shown in FIG. 2, the relation between an input voltage $V_{in}$ applied across terminals 1 and 1' and an output voltage $V_{out}$ appearing across terminals 2 and 2' in the circuit of FIG. 1 varies in association with the magnitude of driving voltage E. Or more precisely, the input-output characteristics of the circuit are such that the circuit shows an ordinary amplifying action when the driving voltage E is smaller than a certain value operatively increasing the output thereof in proportion to the increase of the driving voltage E and the circuit shows an on-off characteristic having two output voltages $V_{ov}$, $V_{ol}$ when the driving voltage E becomes as great as a certain value (hereinafter to be referred to as a boundary voltage $E_m$). In FIG. 2, a boundary input $V_m$ on the axis of abscissa representing the input voltage is a value which is individual to the circuit and which is determined solely by a circuit constant. At a further greater value of the driving voltage E, the boundary input $V_m$ is divided into two values $V_a$ and $V_b$ and thus a hysteresis characteristic is developed. As the driving voltage E is decreased, the on-off characteristic disappears and the amplification characteristic again appears.

Now, suppose an input voltage $V_{in}$ is applied to the input terminals 1 and 1' in FIG. 1. When the driving voltage E is smaller than a boundary voltage $E_m$, the output terminals exhibit an oput $$V_{out} = V_{in} \cdot G(E)$$

where $G(E)$ means that the amplification degree $G$ is a function of the driving voltage E (see FIG. 2). Then the driving voltage E may be increased and grow equal to or larger than the voltage value $E_m$ ($E \geq E_m$), so that the output will be $$V_{out} = \begin{cases} V_{ov} & V_{in} > V_m \\ V_{ol} & V_{in} < V_m \end{cases}$$

showing an on-off characteristic in response to the input. Consequently it should be particularly noted that even such a small error voltage can be discriminated according to the present invention. This will be explained hereinafter with reference to the drawings.

Figure 3:
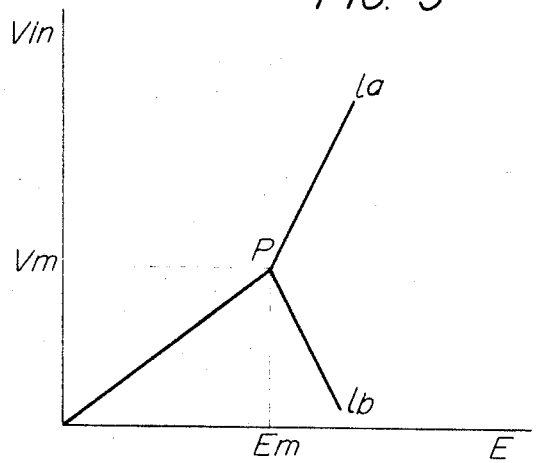
FIG. 3 is also a graphic explanatory representation of driving voltage-input voltage characteristics in the circuit of FIG. 1.

FIG. 3 shows a relation between the driving voltage E and the input voltage $V_{in}$. From the characteristic curve shown in FIG. 3, it will be understood that an ordinary amplification action is shown in a range wherein the driving voltage E is smaller than the boundary voltage $E_m$, and a bistable operation of the circuit appears when the driving voltage E becomes as great as the boundary voltage $E_m$, and further the boundary signal $V_m$ varies along with respective lines $1a$ and $1b$ when the driving voltage E becomes greater than the boundary voltage $E_m$. Such phenomenon is considered to result from variation of the magnitude of the current amplification factor $\beta$ of the transistors due to variation in the magnitude of the driving voltage E and attendant variation in the amplification degree of the circuit, and, of course, is also seen in an electronic tube circuit. It will be understood therefore that, in case the input voltage $V_{in}$ applied across the terminals 1 and 1' is greater than the boundary input $V_m$, at the moment the driving voltage E becomes as great as the boundary voltage $E_m$, the output voltage $V_{out}$ appearing across the terminals 2 and 2' takes the value $V_{ov}$ and, in case $V_{in}$ is smaller than $V_m$, $V_{out}$ takes the value $V_{ol}$. Thus, it is possible to discriminate by the circuit of FIG. 1 whether the value of $V_m$ minus $V_m$ is positive or negative.

As explained above and illustrated in FIG. 1, the characteristic curve does not branch off so long as the driving voltage E is smaller than the boundary voltage $E_m$, and begins to branch off with a critical value of $E_m$ to the driving voltage E at the break point P. This means that the input is allowed to follow the line $1a$ or $1b$ according to the magnitude of the input voltage $V_{in}$ and consequently the polarity of a difference or error voltage $V_{in}$ minus $V_m$ at the break point P. The output voltage $V_{out}$ will be $V_{ov}$ or $V_{ol}$ according as the input follows the line $1a$ or $1b$. As a consequence, even a very small error voltage can be discriminated as to whether it is positive or negative because the difference voltage $V_{in}$ minus $V_m$ is distinguishable in the vicinity of the point P however small it may be.

The on-off signal generator according to the present invention is based on the operating principle as described above and can easily be obtained by arranging in a manner to drive a bistable circuit operated by an alternating source. The alternating voltage referred to above may be any voltage having a rising characteristic that will provide the boundary voltage $E_m$ therein and the rate of rise of such a rising characteristic as described above may be considerably slower than the bistable operating speed of the bistable circuit, and actually may be any of alternating current voltage, full-wave rectification voltage, half-wave rectification voltage and triangular wave voltage.

Figure 4:
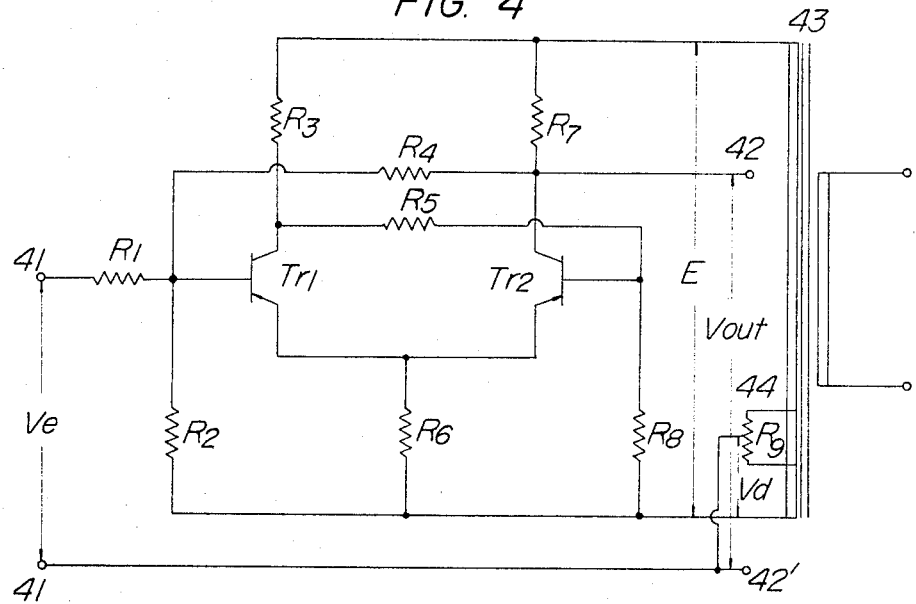
FIG. 4 is a circuit diagram showing one form of the on-off signal generator according to the present invention.

Now, the operation of the on-off signal generator will be described with reference to an embodiment shown in FIG. 4, in which a bistable circuit is arranged to be driven by alternating current voltage. The circuit shown in FIG. 4 comprises input terminals 41 and 41', output terminals 42 and 42', transistors $T_{r1}$ and $T_{r2}$, a driving power transformer 43, a voltage divider 44 to derive the drive voltage of the circuit from the driving A.C. voltage source, and resistance $R_1$-$R_9$. The circuit in FIG. 4 is constructed such that the derived drive voltage for the circuit $V_d$ is supplied to the circuit to give a biasing voltage thereto and operative in manner that, when the measured signal $V_e$ is applied across the input terminals 41 and 41', an output voltage $V_{ov}$ or $V_{ol}$ appears across the output terminals 42 and 42' depending on whether the measured signal $V_e$ is positive or negative. This operation of the circuit can be accounted for by considering that the sum of the measured signal $V_e$ and a divided voltage $V_d$ corresponds to the input voltage $V_{in}$ in the circuit of FIG. 1. This can be expressed as $$V_{in} = V_e + V_d \qquad (1)$$

In the above formula, the divided voltage $V_d$ is so determined as to give a boundary input $V_m$ when a driving voltage E becomes as great as a boundary voltage $E_m$ and must satisfy the following formula:

$$V_d = \frac{V_m}{E_m} E \qquad (2)$$

It is to be noted that the regulating resistance $R_9$ in the voltage divider 44 is provided for the purpose of regulating the boundary input $V_m$ since this boundary input $V_m$ is primarily determined by the circuit constant.

When now the driving voltage E is increased until it becomes as high as $E_m$, that is, when $V_{in}$ takes a value given by the following formula, $$V_{in} = V_e + \frac{V_m}{E_m} E_m = V_e + V_m \qquad (3)$$

the output voltage is $V_{ov}$ when the measured signal $V_e$ is positive and the output voltage is $V_{ol}$ when $V_e$ is negative. As the driving voltage is decreased until it becomes negative, both of the transistors $T_{r1}$ and $T_{r2}$ become conductive and the output is reset.

Figure 6:
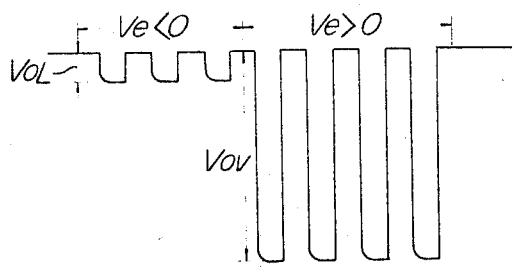
FIG. 6 is a graphic representation of a wave form of output voltage of the on-off signal generator in FIG. 4.
Figure 5:
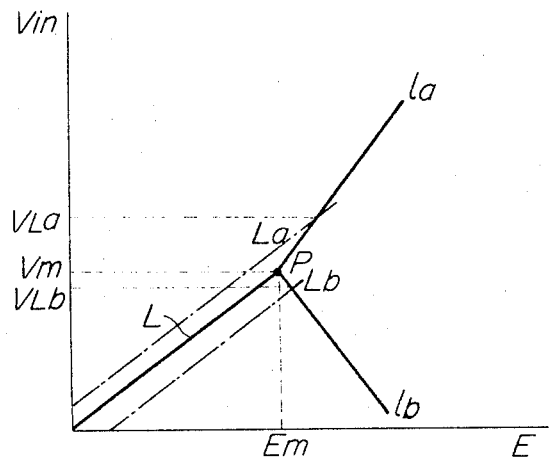
FIG. 5 is a graphic representation of driving voltage-input voltage characteristics in the embodiment shown in FIG. 4.

The operation of the circuit of FIG. 4 will be further explained with reference to a characteristic curve of driving voltage vs. input voltage as shown in FIG. 5. As the driving voltage E is successively increased, the input voltage increases along a line $L_a$ when the measured signal $V_e$ is positive and the intersection of the line $L_a$ with a line $l_a$ gives a value of input voltage $V_{La}$. Since the $V_{La}$ is greater than the boundary input voltage $V_m$, the output of the circuit is $V_{ov}$. In case the measured signal $V_e$ is negative, the input voltage increases along a line $L_b$ and the intersection of the line $L_b$ with a line $l_b$ gives a value $V_{Lb}$. In this case, the output is $V_{ol}$ since the input voltage $V_{Lb}$ is smaller than the boundary input $V_m$. A wave form of such output voltage is shown in FIG. 6 in which a portion with high voltage represents $V_{ov}$ and a portion with low voltage represents $V_{ol}$.

From the foregoing description, it will be known that, according to the present invention, the circuit of FIG. 4 makes the polarity distinguishing action where the driving voltage exceeds the boundary voltage $E_m$ and the reset action in the remainder of the alternating period of the driving voltage, and such polarity determining action can be made as quickly as desired depending on a frequency of driving voltage. In the embodiment shown, the circuit is arranged to be driven by a voltage at a frequency of one kilocycle to effect the polarity determination of one thousand points per second, but it is an extremely easy matter to drive the circuit by a voltage at a frequency of several hundred kilocycles.

Figure 7:
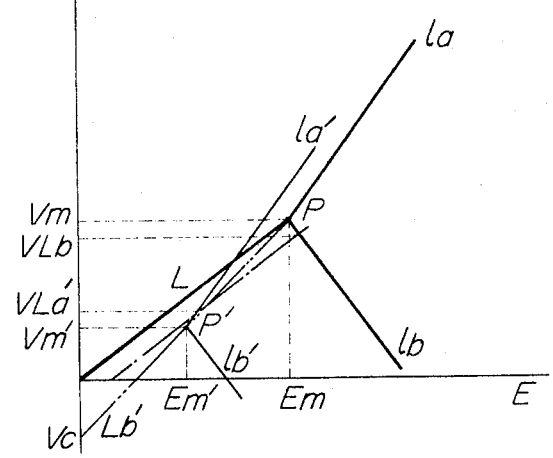
FIG. 7 is a graphic representation of driving voltage-input voltage characteristics similar to FIG. 5, but showing the effect of temperature thereon.
Figure 8:
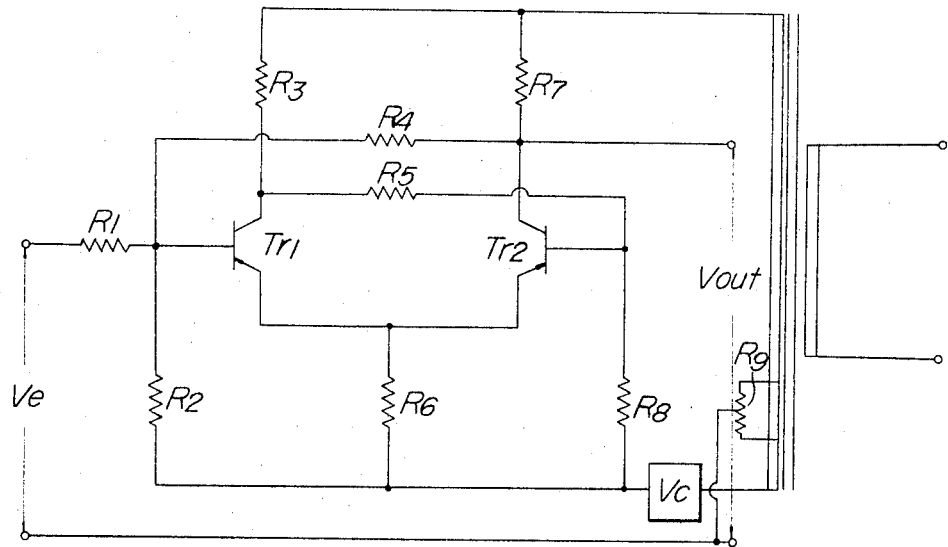
FIG. 8 is a circuit diagram similar to that of FIG. 4, but having a temperature compensation circuit affixed thereto.

The circuit shown in FIG. 4 may possibly be affected by temperature as in case of common semiconductor circuits. In other words, the boundary input voltage $V_m$ and the boundary voltage $E_m$ may vary depending on temperature and thus an erroneous discriminating action may be made with respect to the sign of the error signal $V_e$, as graphically illustrated in FIG. 7. In FIG. 7, lines L, $l_a$ and $l_b$, and lines L', $l_a'$, and $l_b'$ show the relation between the driving voltage E and the input voltage $V_{in}$ at temperatures T and T', respectively. Supposing now that the measured signal $V_e$ is negative, the input voltage at the temperature T is given by the intersection of a line $L_b$ with the line $l_b$, while the input voltage at the temperature T' is given by the intersection of the line $L_b$ with the line $l_a'$. In other words, the value of the input voltage $V_{in}$ is greater or smaller than the boundary input voltage $V_m$ at different temperatures in spite of the same error signal. Thus, he output voltage is variable depending on temperatures, and as a result an erroneous discrimination will be given. According to experiments, the break point or diverging point P moves substantially along the same straight line L' which can be expressed by the following equation $$V_{in} = V_e + \frac{V_m + V_c}{E_m} E - V_c \qquad (4)$$

where, $V_c$ represents a value of $V_{in}$ when the driving voltage E is zero. It will therefore be known that temperature compensation can be effected by merely adding the constant voltage $V_c$ to the driving voltage E. FIG. 8 shows one form of the on-off signal generator of the present invention provided with such temperature compensation means.

FIG. 9 shows a circuit arrangement of a temperature controller which includes therein the on-off signal generator according to the present invention. The temperature controller is composed of a temperature detecting section 910, an on-off signal generator 920, an amplifying and operating circuit section 930 and a power transformer 940. The temperature detecting section 910 comprises a thermocouple 911, a cold junction compensation circuit 912 and a temperature setting circuit 913 and is operative to generate a measured signal resulting from a difference between an electromotive force of the thermocouple 911 and a voltage corresponding to the temperature setting. This measured signal is transmitted to the on-off signal generator 920 provided with a voltage divider circuit 921 and a temperature compensation circuit 922 and is thereby converted while being amplified into an output voltage corresponding to the poistive or negative sign thereof. Then, the output voltage is amplified by an amplifier 931 to drive a relay 932 for actuating an object to be controlled. Marked features of the temperature controller are that it operates effectively even with a measured signal at a very small level, has a simple circuit arrangement and is manufactured at low cost, From the foregoing detailed description, the on-off signal generator of the present invention is featured by its simple circuit arrangement, an excellent resolving power for the sign discrimination and ready response to an input signal to effect quick discrimination thereof. In practice, an on-off signal generator embodying the present invention develops an output voltage $V_{ov}$ of 10 volts when supplied with a measured signal with a value of 100 microvolts or below and thus has an amplification degree of more than 100 decibels.

Figure 10:
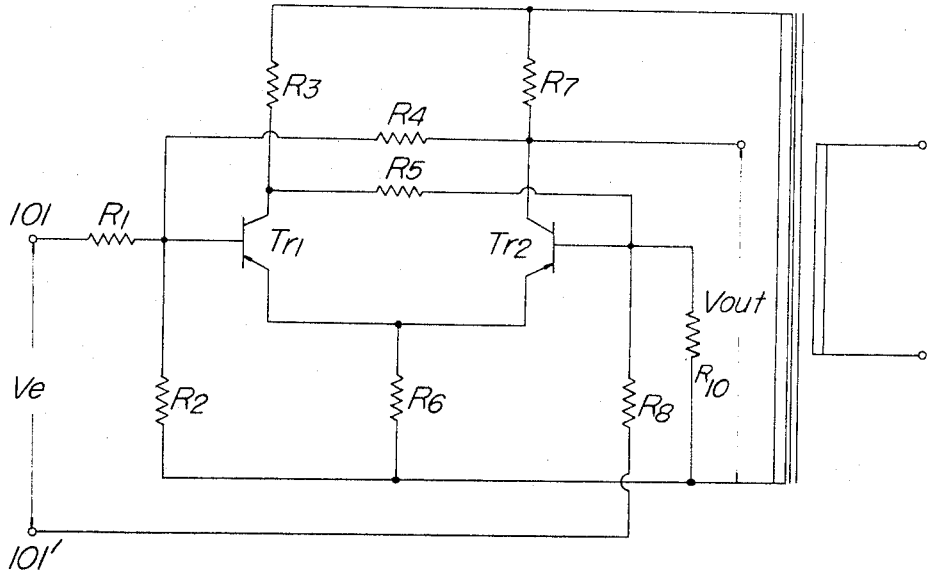
FIG. 10 is a circuit diagram of another form of the on-off signal generator in which an input signal is conducted to the bases of transistors in its bistable circuit.

It will be understood that the bistable circuit referred to in the present invention is not limited to the one as shown in FIG. 1, and another circuit such as an emitter (cathode) coupled multivibrator circuit known as the Schmitt circuit may equally effectively be employed to constitute the on-off signal generator of the invention. Further, the on-off signal generator may have a circuit arrangement as shown in FIG. 10, in which an input signal is applied to the bases of transistors in a bistable circuit. The full symmetry of the circuit thus obtained improves the temperature characteristics.

What is claimed is:

1. A device for detecting the amplitude of a signal applied thereto as compared to a reference quantity represented by a reference voltage comprising:
  bistable circuit means including a pair of cross coupled parallel connected amplifiers capable of selectively providing respective stable states of amplification and bistable operation in dependence upon the power supply voltage applied thereto,
  alternating current voltage supply means providing said power supply voltage connected in parallel with the amplifiers of said bistable circuit means for continuously and repetitively switching said circuit means between said respective stable states.

2. A device as defined in claim 1 wherein said bistable circuit means in the state of bistable operation provides first or second outputs of substantially different amplitude in dependence upon the relative amplitude of said signal as compared to a threshold value of input voltage comparable to said reference voltage.

3. A signal comparator comprising:
  circuit means including a pair of amplifiers connected in parallel and a positive feed back circuit connected from the output of one of said amplifiers to the input of the other of said amplifiers;
  voltage supply means connected to said circuit means as a power source providing to said amplifiers a common voltage which varies periodically from a first value where said circuit means operates as an amplifying circuit to a second value where said circuit means operates as a bistable circuit, said common voltage having a waveform which rises slowly in comparison with the operating speed of said amplifiers, and
  means for supplying an input signal to the input of one of said amplifiers.

4. A signal comparator set forth in claim 3, in which the voltage of said voltage supply means varies alternatively and rises slowly in comparison with the operating speed of said amplifiers.

5. A signal comparator set forth in claim 3, in which said voltage supply means includes an alternating current transformer, said amplifiers being connected to the output of said transformer.

6. A signal comparator set forth in claim 3, in which an input signal is supplied between the inputs of said amplifiers.

7. A signal comparator comprising:
  a pair of amplifiers each including a transistor
  a bistable circuit including said amplifiers connected in parallel relation and having a pair of cross coupled feedback circuits,
  voltage supply means connected in parallel to said amplifiers in bistable circuit as a power source providing to said amplifiers a common voltage which varies repetitively and continuously from a first value to a second value including a threshold value where said bistable circuit transfers from an amplifier operation to a bistable operation, said common voltage having a characteristic which rises slowly in comparison to the operating speed of said amplifiers, and
  means for supplying an input signal to the input of one of said amplifiers.

8. A signal comparator comprising
  a bistable circuit including a pair of amplifiers connected in parallel relation having a pair of cross coupled positive feedback circuits,
  voltage supply means connected to said bistable circuit as a power source providing to said amplifiers a common voltage which varies periodically from about zero to a predetermined value and rises slowly in comparison with the operating need of said amplifier,
  means for providing a reference voltage proportional to the voltage of said voltage supply means,
  input circuit means for providing at the input of one of said amplifiers the combination of said input signal and said reference voltage.

9. A signal comparator set forth in claim 8, in which said voltage supply means includes an alternating current transformer and a constant voltage source—inserted in series between said amplifiers and the output of said transformer.

References Cited by the Examiner

UNITED STATES PATENTS

| | | | |
|---|---|---|---|
| 2,920,215 | 1/1960 | Lo | 307—88.5 |
| 2,992,340 | 7/1961 | Floyd | 307—88.5 |
| 3,017,523 | 1/1962 | Harris | 307—88.5 |
| 3,074,020 | 1/1963 | Ropiequet | 307—88.5 |

ARTHUR GAUSS, *Primary Examiner.*

JOHN W. HUCKERT, *Examiner.*

J. BUSCH, *Assistant Examiner.*